United States Patent [19]

Imazeki et al.

[11] 4,433,275
[45] Feb. 21, 1984

[54] THREE-DIMENSIONAL TRACER CONTROL SYSTEM

[75] Inventors: Ryoji Imazeki; Etsuo Yamazaki, both of Hachioji, Japan

[73] Assignee: Fujitsu Fanuc Ltd., Tokyo, Japan

[21] Appl. No.: 269,592

[22] Filed: Jun. 2, 1981

[30] Foreign Application Priority Data

Jun. 3, 1980 [JP] Japan .................................. 55-74832

[51] Int. Cl.³ .............................................. H02P 7/06
[52] U.S. Cl. .................................... 318/578; 318/575; 318/625
[58] Field of Search ............... 318/567, 575, 576, 577, 318/578, 625

[56] References Cited

U.S. PATENT DOCUMENTS

| | | | |
|---|---|---|---|
| 2,922,052 | 1/1960 | Peaslee | 318/575 X |
| 4,104,684 | 8/1978 | Wakami et al. | 318/576 X |
| 4,117,324 | 9/1978 | Francke | 318/577 X |
| 4,129,814 | 12/1978 | Francke | 318/577 |
| 4,224,670 | 9/1980 | Yamazaki | 318/571 X |
| 4,296,473 | 10/1981 | Imazeki et al. | 318/578 X |
| 4,370,722 | 1/1983 | Imazeki et al. | 318/578 X |

*Primary Examiner*—J. V. Truhe
*Assistant Examiner*—Richard M. Moose
*Attorney, Agent, or Firm*—Staas & Halsey

[57] ABSTRACT

A three-dimensional tracer control system which is provided with an integration circuit for integrating the difference between a Z-axis direction displacement signal and a reference displacement signal and an adder for adding together the above-mentioned difference and the output from the integration circuit. The trace velocity in the Z-axis direction is controlled by the output from the adder, by which it is possible to perform tracing, with the Z-axis direction displacement signal and the reference displacement signal held nearly equal to each other; consequently, machining accuracy is increased.

2 Claims, 3 Drawing Figures

THREE-DIMENSIONAL TRACER CONTROL SYSTEM

BACKGROUND OF THE INVENTION

The present invention relates to a three-dimensional tracer control system which permits a highly accurate machining operation.

There has heretofore been put to practical use a three-dimensional tracer control system that traces the configuration of a model in the X-Y plane by X- and Y-axis direction displacement signals available from a tracer head and controls the trace velocity in the Z-axis direction by a Z-axis direction displacemnt signal. FIG. 1 illustrates in block form an example of such a conventional system. In FIG. 1, reference numeral 1 indicates a tracer head; 2 designates a stylus; 3 identifies a displacement resultant circuit; 4 and 9 denote adders; 5 and 6 represent velocity components arithmetic circuits; 7 shows a distributing circuit; 8 refers to a displacement direction index circuit; 10 indicates an amplifier; 11 to 13 designate drivers; and 14 to 16 identify motors.

The tracer head 1 yields displacement signals $\epsilon_x$, $\epsilon_y$ and $\epsilon_z$ corresponding to displacement of the stylus 2 in the X-, Y- and Z-axis directions. The displacement signals $\epsilon_x$ and $\epsilon_y$ are provided to the displacement resultant circuit 3 and the displacement direction index circuit 8 and the displacement signal $\epsilon_z$ is applied to the adder 9. The displacement resultant circuit 3 obtains a resultant displacement signal $\epsilon = \sqrt{\epsilon_x^2 + \epsilon_y^2}$ from the displacement signals $\epsilon_x$ and $\epsilon_y$ and applies it to the adder 4. The displacement direction index circuit 8 derives displacement direction signals $\sin\theta$ and $\cos\theta$ from the displacement signals $\epsilon_x$ and $\epsilon_y$ and provides them to the distributing circuit 7.

The adder 4 detects a difference $\Delta\epsilon = \epsilon - \epsilon_0$ between the resultant displacement signal $\epsilon$ from the displacement resultant circuit 3 and a reference displacement signal $\epsilon_0$. The velocity components arithmetic circuits 5 and 6, which are supplied with the output from the adder 4, derive therefrom a normal-direction velocity signal $V_N$ and a tangential-direction velocity signal $V_T$, respectively, which are provided to the distributing circuit 7. Based on the normal-direction velocity signal $V_N$, the tangential-direction velocity signal $V_T$ and the displacement direction signals $\sin\theta$ and $\cos\theta$, the distributing circuit 7 produces velocity command signals in the X- and Y-axis directions by which the difference $\Delta\epsilon$ between the resultant displacement signal $\epsilon$ and the reference displacement signal $\epsilon_0$ is reduced to zero. The velocity command signals are applied to the drivers 11 and 12, which drive the motors 14 and 15 in response to the velocity command signals.

The adder 9, which is supplied with the displacement signal $\epsilon_z$, detects a difference $\epsilon_z - \epsilon_{z0}$ between it and a reference displacement signal $\epsilon_{z0}$. The difference $\epsilon_z - \epsilon_{z0}$ thus obtained is applied via the amplifier 10 to the driver 13, causing it to drive the motor 16 which performs the Z-axis control. By driving the motors 14 to 16 in the manner described above, the tracer head 1 and a cutter (not shown) are fed together to achieve machining operations of a work (not shown).

Now, consider tracing of such a slope as shown in FIG. 3 which has an angle of inclination $\alpha$. In this case, assuming that the trace velocity in the X-Y plane is $V_{XY}$, it is necessary that the trace velocity $V_Z$ in the Z-axis direction be as follows:

$$V_Z = V_{XY} \cdot \tan\alpha \tag{1}$$

In the conventional three-dimensional tracer control system, since the trace velocity $V_Z$ in the Z-axis direction is in proportion to the difference $(\epsilon_z - \epsilon_{z0})$ between the displacement signal $\epsilon_z$ and the reference displacement signal $\epsilon_{z0}$ in the Z-axis direction, the Z-axis velocity $V_Z$ is given by the following expression (2):

$$V_Z = K(\epsilon_z - \epsilon_{z0}) \tag{2}$$

where K is a proportional constant.

From expressions (1) and (2), the displacement signal $\epsilon_z$ in the Z-axis direction becomes as follows:

$$\epsilon_z = \frac{V_{XY} \cdot \tan\alpha}{K} + \epsilon_{z0} \tag{3}$$

As is evident from expression (3), the displacement signal $\epsilon_z$ in the Z-axis direction varies with a change in the feed rate $V_{XY}$ in the X-Y plane or the angle of inclination $\alpha$, resulting in variations in machining accuracy. In other words, the prior art tracer control system has the defects of inaccurate machining operations and degraded traceability in the X-Y plane.

SUMMARY OF THE INVENTION

An object of the present invention is to provide a three-dimensional tracer control system with which it is possible to obtain a high degree of machining accuracy.

Another object of the present invention is to provide a three-dimensional tracer control system which permits tracing in the state in which the displacement signal and the reference one in the Z-axis direction are held substantially equal to each other.

Briefly stated, the three-dimensional tracer control system of the present invention is provided with an integration circuit for integrating the difference between the displacement signal and the reference one in the Z-axis direction, and an adder for adding together the abovesaid difference and the output from the integration circuit and controls the trace velocity in the Z-axis direction in accordance with the output from the adder.

DESCRIPTION OF THE PREFERRED EMBODIMENTS

Figure 1:
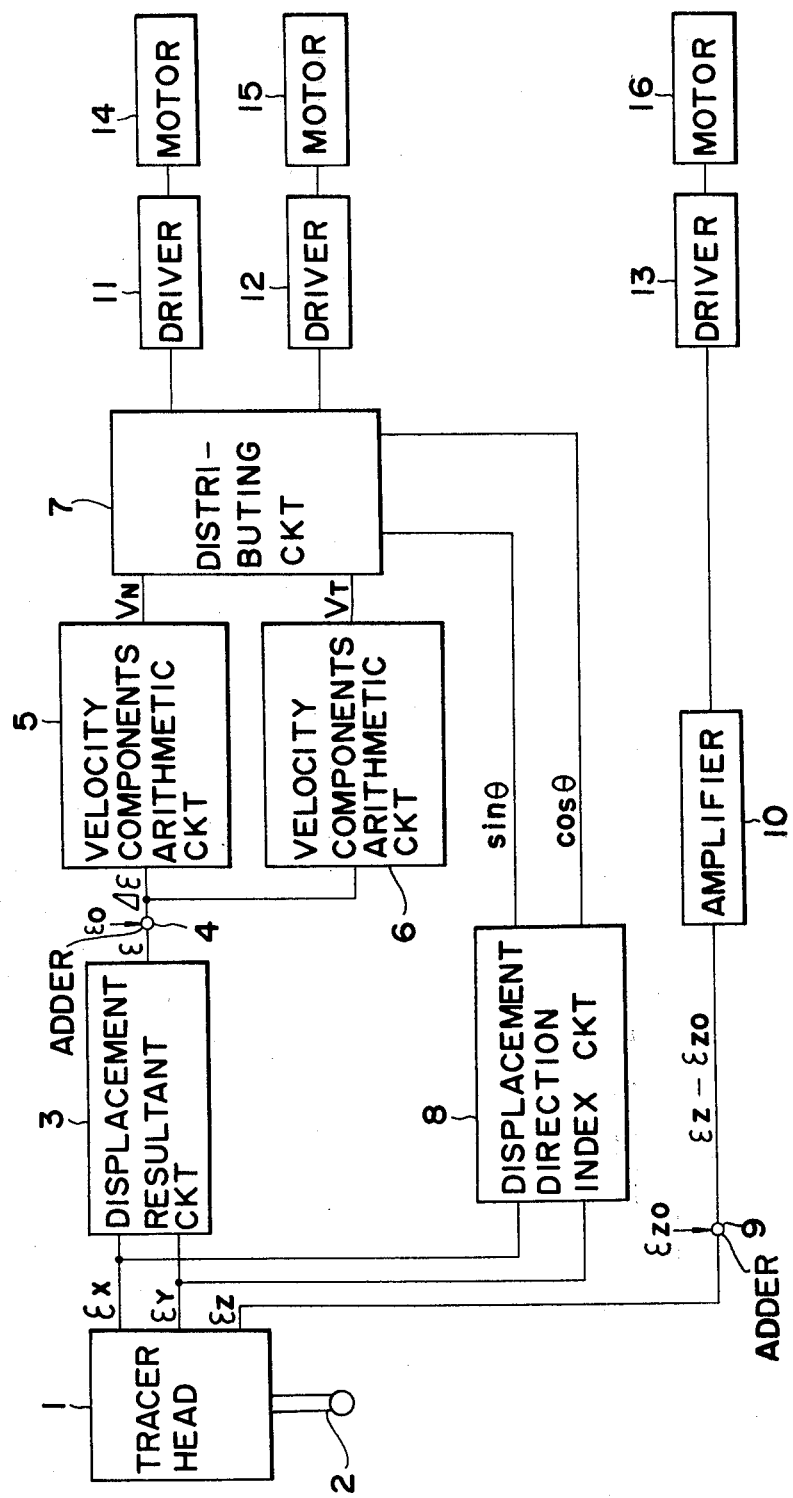
FIG. 1 is a block diagram showing a prior art example.
Figure 2:
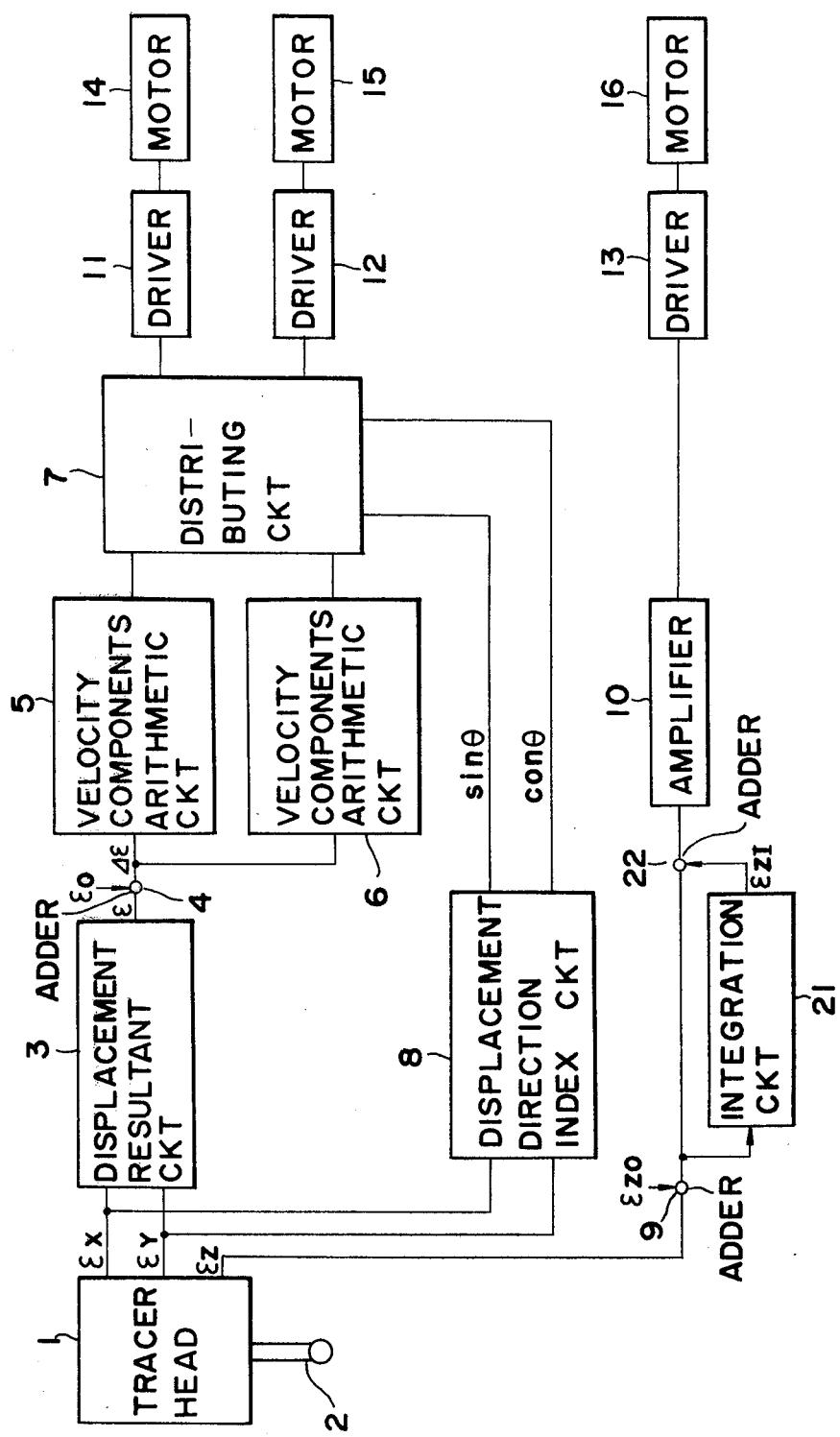
FIG. 2 is a block diagram illustrating an embodiment of the present invention.

The embodiment of the present invention illustrated in FIG. 2 differs from the prior art example of FIG. 1 in the provision of an integration circuit 21 for integrating the output $(\epsilon_z - \epsilon_{z0})$ from the adder 9 and an adder 22 for adding together the output $\epsilon_{zI} = \int(\epsilon_z - \epsilon_{z0})dt$ from the integration circuit 21 and the output from the adder 9. In FIG. 2 the parts corresponding to those in FIG. 1 are identified by the same reference numerals.

Accordingly, in this embodiment the trace velocity $V_Z$ in the Z-axis direction is given by $$V_Z = K(\epsilon_z - \epsilon_{z0} + \epsilon_{zI}) \quad (4)$$

where K is a proportional constant.

Figure 3:
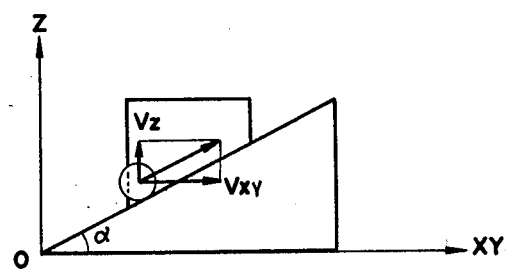
FIG. 3 is a diagram explanatory of the operation of each of the prior art example shown in FIG. 1 and the embodiment of the present invention depicted in FIG. 2.

Assuming that the slope such as shown in FIG. 3 is traced at the velocity $V_{XY}$ (which is the trace velocity in the X-Y plane), it is necessary that the trace velocity $V_Z$ in the Z-axis direction be such as given by expression (1), as mentioned previously; accordingly, the displacement signal $\epsilon_z$ in the Z-axis direction becomes, from expressions (1) and (4), as follows:

$$\epsilon_z = \frac{V_{XY} \cdot \tan\alpha}{K} + \epsilon_{z0} - \epsilon_{zI} \quad (5)$$

when $\epsilon_z - \epsilon_{z0} \neq 0$, the output $\epsilon_{zI} = \int(\epsilon_z - \epsilon_{z0})dt$ from the integration circuit 21 approaches $(V_{XY}\cdot\tan\alpha)/K$ so that $\epsilon_{zI} = (V_{XY}\cdot\tan\alpha)/K$; therefore, tracing can be conducted with $\epsilon_z = \epsilon_{z0}$, thus increasing the degree of machining accuracy.

As has been described in the foregoing, the present invention is provided with the integration circuit, for integrating the difference between the displacement signal and the reference one in the Z-axis direction, and the adder for adding together the abovesaid difference and the output from the integration circuit, and which controls the trace velocity in the Z-axis direction in accordance with the output from the adder, so that tracing can be performed with the displacement signal and the reference one in the Z-axis direction held substantially equal to each other. Accordingly, the present invention possesses the advantage of increased machining accuracy.

It will be apparent that many modifications and variations may be effected without departing from the scope of the novel concepts of this invention.

What is claimed is:

1. A three-dimensional tracer control system which traces the configuration of a model based on direction displacement signals from a tracer head, said system comprising:

said tracer head providing X-, Y- and Z-axis direction displacement signals as said direction displacement signals;

X-Y means for controlling the tracing of said tracer head in the X-Y plane according to said X- and Y-axis direction displacement signals and a desired value of a function thereof;

an integration circuit for integrating the difference between said Z-axis direction displacement signal and a desired value thereof;

an adder for adding together said difference and the output from said integration circuit; and means for controlling the trace velocity in the Z-axis direction in accordance with the output signal from said adder.

2. The system of claim 1, said X-Y means controlling the tracing of said tracer head in the X-Y plane according to the positive square root of the sum of the squares of the said X- and Y-axis direction displacement signals and a desired value therefor.

* * * * *